UNITED STATES PATENT OFFICE.

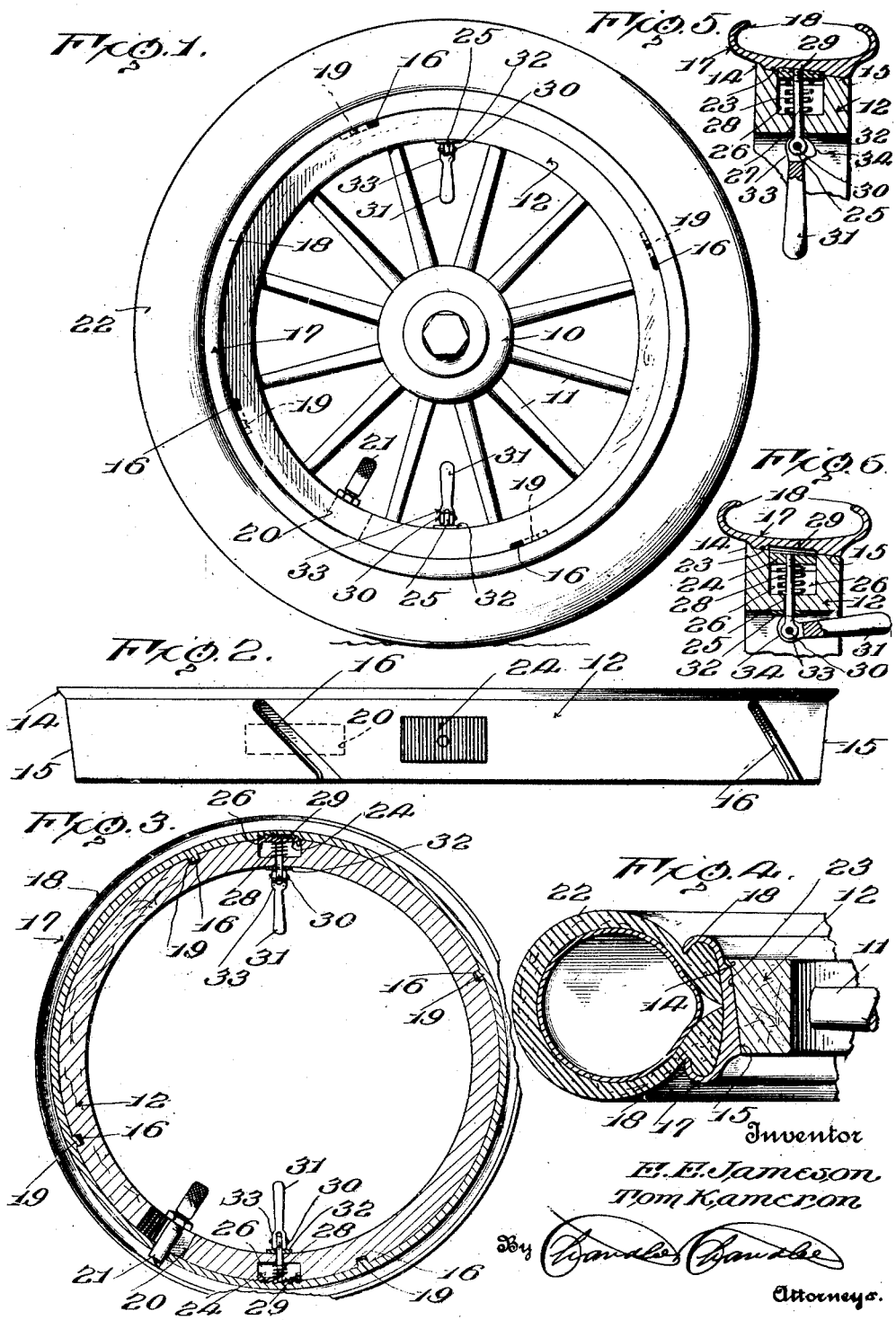

EDGAR E. JAMESON AND TOM KAMERON, OF SCHLATER, MISSISSIPPI, ASSIGNORS OF ONE-THIRD TO ED. JONES, OF SCHLATER, MISSISSIPPI.

DEMOUNTABLE RIM.

1,367,395. Specification of Letters Patent. Patented Feb. 1, 1921.

Application filed March 31, 1919. Serial No. 286,280.

*To all whom it may concern:*

Be it known that we, EDGAR E. JAMESON and TOM KAMERON, citizens of the United States, residing at Schlater, in the county of Leflore, State of Mississippi, have invented certain new and useful Improvements in Demountable Rims; and we do hereby declare the following to be a full, clear, and exact description of the invention, such as will enable others skilled in the art to which it appertains to make and use the same.

This invention has reference to improvements in demountable rims and more particularly to improved fastening means for securing the rim on the felly of the wheel, the object of the invention being to permit a rim with a tire engaged thereon to be instantaneously removed without the aid of any tool whatsoever, replacement of a rim with a new tire being accomplished with equal facility, while the construction is also such that the rim will not squeak or become loose as is general with demountable rims.

The invention further consists in the provision of a wheel having a tapered felly equipped with a flange at one side and having means for engagement by a demountable rim so as to secure the latter to the wheel felly in a novel and efficient manner insuring its retention under shocks, strains and vibrations, while the greater the driving strain the more rigid will the rim be held on the wheel, the locking means between the demountable rim and the felly being such that through the medium of a ratchet locking device, the rim will be prevented from backing off when the direction of the car is reversed, said locking device being capable of convenient manipulation to release it whereby a tire can be removed for repair or replacement in an instant, thus lending the device special advantage in connection with automobile races, or wherever the facility of quick removal and renewal of a tire is desirable.

With the above objects and others in view as will appear as the specification proceeds, the invention comprises certain novel combinations and arrangements of parts as will be hereinafter more particularly pointed out and claimed.

Reference is had to the accompanying drawings forming a part of this application, wherein like characters designate corresponding parts throughout the several views, in which—

Figure 1 is a side elevation of a wheel having a demountable rim in accordance with the invention;

Fig. 2 is a plan view of the wheel with the rim removed;

Fig. 3 is a longitudinal section with the demountable tire carrying rim in position;

Fig. 4 is a cross sectional view taken through the felly and rim;

Fig. 5 is a sectional view taken through the automatic locking device in a locked position, and Fig. 6 is a sectional detail showing the automatic ratchet locking device released.

Referring to the drawings in detail, there is shown a demountable wheel having the usual hub 10, spokes 11 and a felly 12. This felly is mounted upon the spokes and is provided at one side with a flange 14, the peripheral surface 15 of the felly sloping toward the opposite side so as to produce a felly of tapered cross section.

Upon its peripheral surface the felly 12 is equipped with a plurality of diagonally extending grooves 16 extending to and closed by the flange 14 and opening at the opposite side or edge of the felly. Four of these grooves are preferably employed, all extending in the same direction with the closed ends of the grooves disposed in a direction opposite to that in which the wheel rotates, while the entrance or open mouths of the grooves extend in the same direction.

Coöperating with the wheel and its felly, is a demountable rim 17, the latter being of any preferred type so as to retain the tire thereon, but being shown of the clencher type having fixed retaining flanges 18. Projecting inwardly at equidistantly spaced points from the demountable rim at its inner face are a plurality of lugs 19, preferably four or more corresponding to the number of grooves in the felly and designed to engage said grooves in the lateral and circumferential movement of the rim relative to the felly in applying and removing the rim with or without a tire thereon.

The felly is further provided intermediately of two spokes, with a slot 20 designed to receive the inflation valve 21 of the air tube within the tire 22 engaged on the demountable rim and projecting through an opening in the latter. The purpose of this slot is to permit longitudinal or rotative movement of the valve stem with respect to to the felly. In applying this rim, its lugs are engaged in the grooves through the wide entrance portions thereof, and the whole rim then given a lateral and rotative or circumferential movement with respect to the felly so that the demountable rim will be moved laterally into abutment with the flange 14 while the lugs are moved obliquely to the inner ends of the grooves. To permit this the inner edge of the demountable rim corresponding to the side which fits the flange 14, is chamfered so as to conform with the said flange, and the inner face of the rim is beveled or tapered as at 23 so as to conform to the surface 15 of the felly, by reason of its opposite bevel or taper.

In order to lock the demountable rim in position when so engaged with the felly, a ratchet locking device is provided, the same consisting of a plurality, preferably two ratchet faced plates 24 having shank portions 25, the plates being of a curvature to conform to the curvature of the felly and disposed within recesses or seats 26 in the felly while the shank portions 25 are engaged through radial openings 27 communicating with the recesses or seats 26. Coiled expansible springs 28 inclose the shank portions within the seats and between the inner walls of said seats and the ratchet plates so as to normally force the latter outwardly and their teeth into corresponding ratchet teeth 29 suitably formed in the inner surface of the demountable rim. It should be noted that these ratchet teeth and plates are spaced from the sides or edges of the rim and felly and disposed between pairs of spokes, preferably at diametrically opposite sides of the wheel, the teeth of the plates being so disposed that the rim will be prevented from backing off or becoming displaced relative to the felly when the direction of the car is reversed. On the other hand, rotation of the wheel while the car moves forward tends to press the lugs 19 closely into the inner closed ends of the grooves 16, and therefore when the driving strain is increased, the rim will be more tightly secured in position on the felly. In order to disengage the spring actuated movable ratchet plates carried by the felly, from engagement with the ratchet teeth within the rim, the shank portion of each is provided with an aperture through which a pivot pin 30 is engaged so as to pivotally secure a cam lever 31 to the shank. A washer plate 32 is engaged on the shank and a cam lever 31 is provided with a bifurcation producing jaws 33 having alined apertures engaged by the pivot pin 30. When the levers are in alinement with the spokes the cams 34 are so disposed that the springs will be allowed to project the ratchet plates carried by the felly, but when it is desired to disengage the latter, the lever of each device is swung downwardly and outwardly, thereby compressing the interfitting springs on the shank portions of the ratchet plates carried by the felly so as to retract said plates from engagement with the rim plates, thereby permitting the demountable rim to be removed from the felly. Furthermore, this operation can be very quickly carried out without the aid of any tool and all noise and possibility of the device working loose will be prevented, since use of bolts and nuts as is common in demountable rim construction, is obviated.

What is claimed is:

1. The combination with a wheel felly whose surface is transversely tapered, said surface having a plurality of obliquely disposed grooves whose inner ends are closed and whose other ends are open at the low side of the felly, the latter having a slot for the passage of the valve nipple and its movement circumferentially of the felly; of a rim whose inner face is beveled to correspond with the surface of said felly, a series of lugs projecting from said inner face at points to coact with said grooves, the inner face of the rim having ratchet teeth at intervals, plates disposed at corresponding intervals in the felly and having ratchet teeth on their outer faces, springs bearing said plates normally outward, and manually operable means for drawing them inward.

2. In a wheel having a felly of tapered cross section and having a flange upon the side, the peripheral face of the felly having a plurality of equidistantly spaced diagonal grooves communicating with the side opposite the flange, the demountable rim having a tapered cross section conforming to the felly interiorly and beveled to fit the flange, said felly having a slot therethrough to receive an inflating valve of a tire adapted to be arranged upon the rim and the rim having a plurality of lugs equidistantly spaced in the same relation as the grooves of the felly and extending inwardly from the rim and intermediately of its side edges for engagement with the grooves, ratchet teeth being formed on the inner face of the rim, a ratchet plate mounted in the outer face of the felly and having a shank portion extending through the felly, spring means normally projecting the said ratchet plate to engage the said ratchet teeth and a cam lever on the shank portion of the said ratchet plate and on the inside of the felly to retract the said ratchet plate and hold the same in retracted position out of engagement with the said ratchet teeth to permit application and removal of the demountable rim, as and for the purposes specified.

In testimony whereof we affix our signatures in the presence of two witnesses.

EDGAR E. JAMESON.
TOM KAMERON.

Witnesses:
B. K. GLENN,
W. V. BAILEY.